United States Patent
Mayer

(10) Patent No.: US 8,845,212 B1
(45) Date of Patent: Sep. 30, 2014

(54) NODAL COMPACT TILT MECHANISM

(71) Applicant: Stewart Ray Mayer, Dallas, TX (US)

(72) Inventor: Stewart Ray Mayer, Dallas, TX (US)

( * ) Notice: Subject to any disclaimer, the term of this patent is extended or adjusted under 35 U.S.C. 154(b) by 0 days.

(21) Appl. No.: 14/264,969

(22) Filed: Apr. 29, 2014

Related U.S. Application Data

(60) Provisional application No. 61/816,935, filed on Apr. 29, 2013.

(51) Int. Cl.
*G03B 17/00* (2006.01)
*G03B 17/56* (2006.01)

(52) U.S. Cl.
CPC .................... *G03B 17/561* (2013.01)
USPC ........................................................ 396/428

(58) Field of Classification Search
USPC .......................................................... 396/428
See application file for complete search history.

(56) References Cited

U.S. PATENT DOCUMENTS

| | | | | | |
|---|---|---|---|---|---|
| 2,766,007 | A | * | 10/1956 | Krilanovich | 254/124 |
| 3,273,484 | A | * | 9/1966 | Lapsley | 224/185 |
| 3,995,797 | A | * | 12/1976 | Knight | 248/184.1 |
| 4,637,536 | A | * | 1/1987 | Wong | 224/262 |
| 5,088,676 | A | * | 2/1992 | Orchard et al. | 248/421 |
| 5,469,793 | A | * | 11/1995 | Lindsay | 108/2 |
| 5,940,645 | A | * | 8/1999 | Bonin | 396/428 |
| 7,527,439 | B1 | * | 5/2009 | Dumm | 396/419 |
| 7,623,181 | B2 | * | 11/2009 | Ibaraki | 348/373 |
| 2013/0034347 | A1 | * | 2/2013 | Randy et al. | 396/428 |

* cited by examiner

*Primary Examiner* — Rodney Fuller
(74) *Attorney, Agent, or Firm* — W. Thomas Timmons

(57) ABSTRACT

A tilt mechanism allows for nodal tilt of a camera or other payload to a high degree without obstructing any side of the camera. It uses two rotating plates that are linked together with linkage arms. The linkage arms transfer the rotational movement of the plates above the mechanism to a camera attachment plate. The rotating plate has a nodal point identical to the linkage plates, above the plate where the camera is positioned. There is no side support in this design to interfere with access to the camera on all sides.

8 Claims, 4 Drawing Sheets

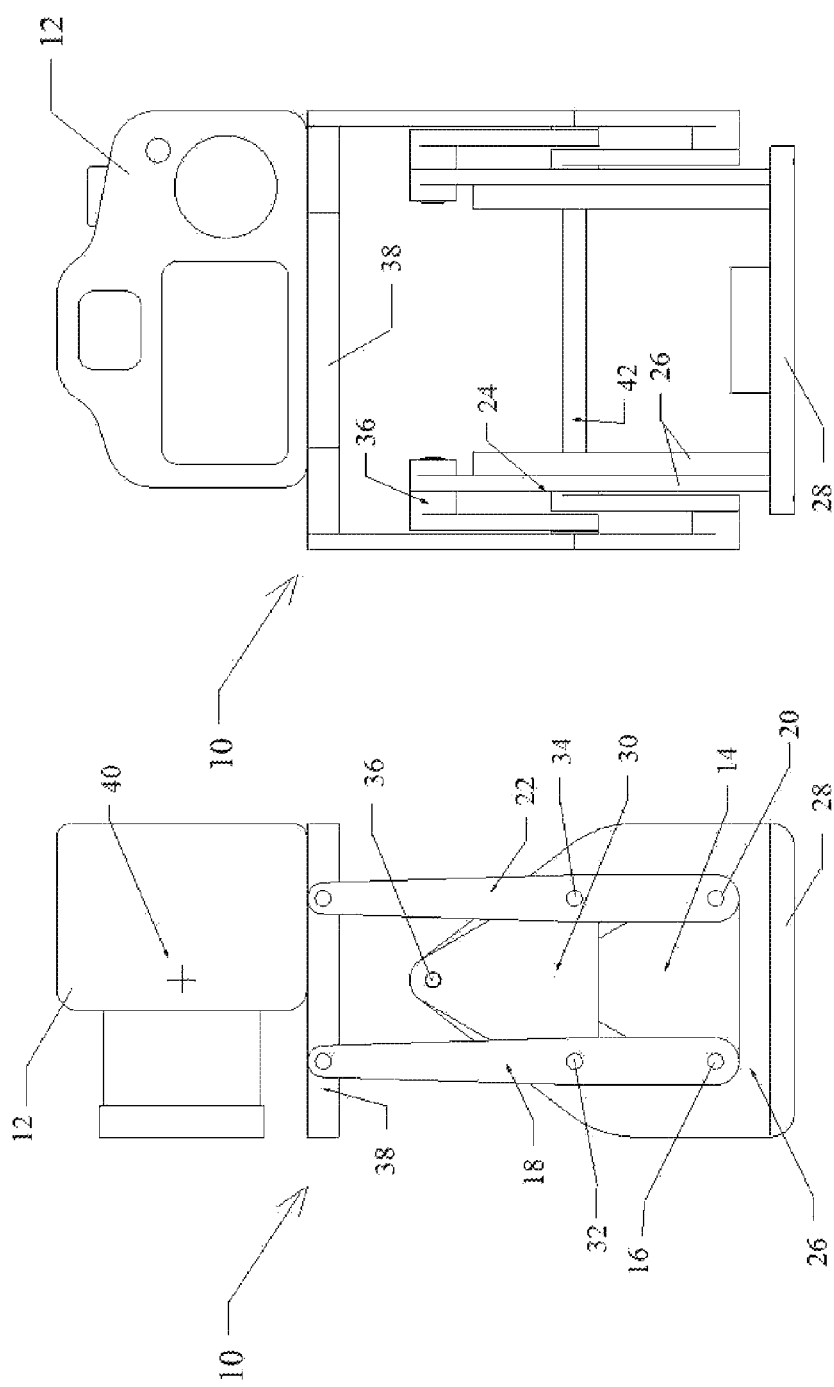

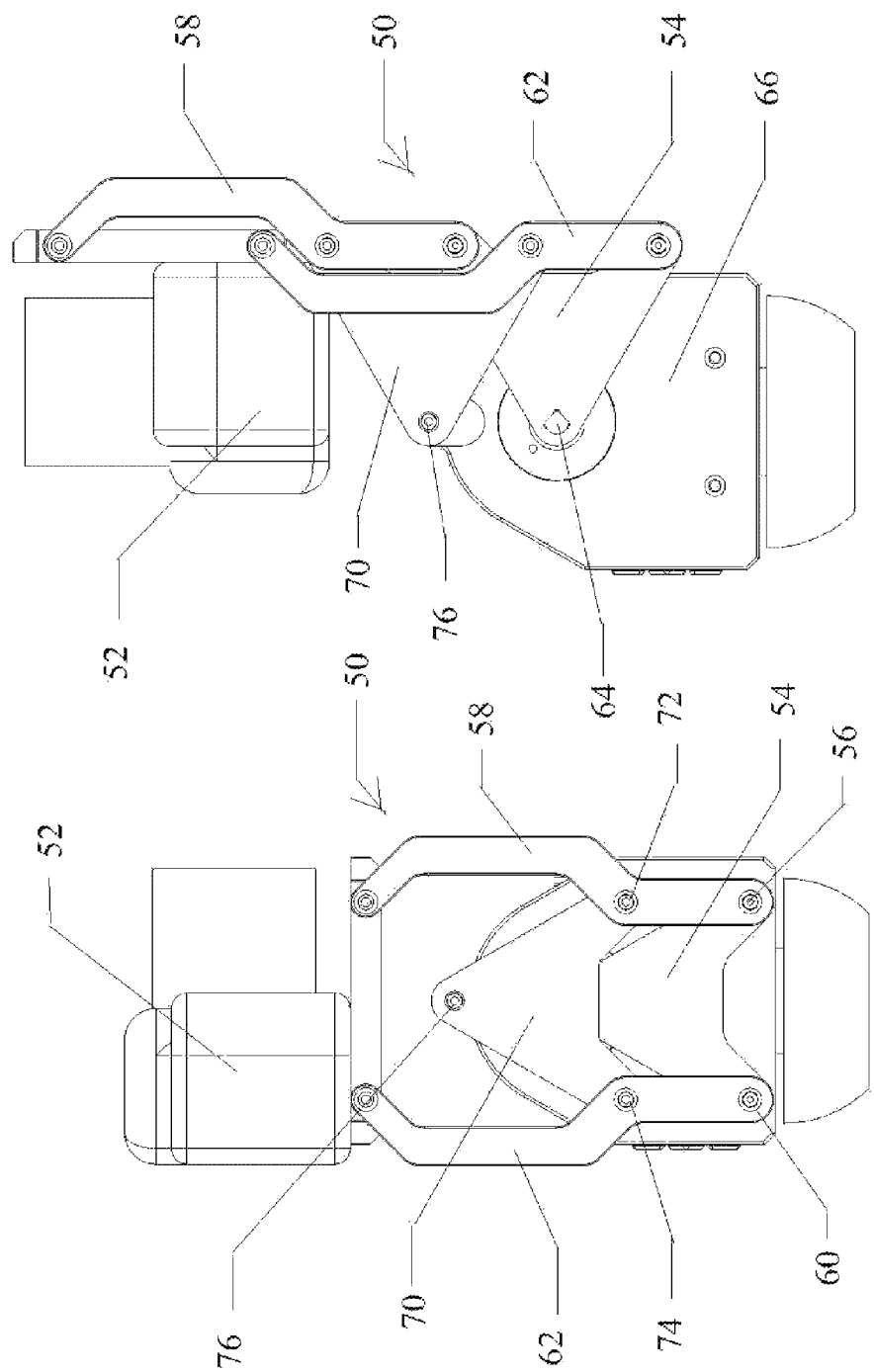

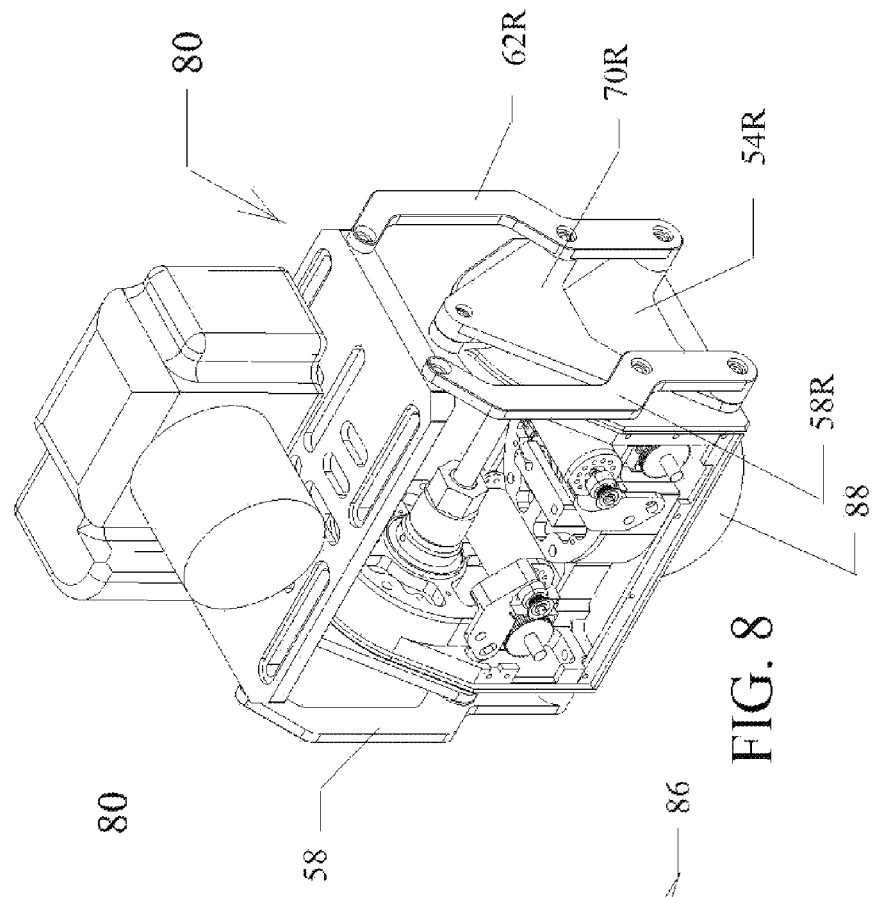
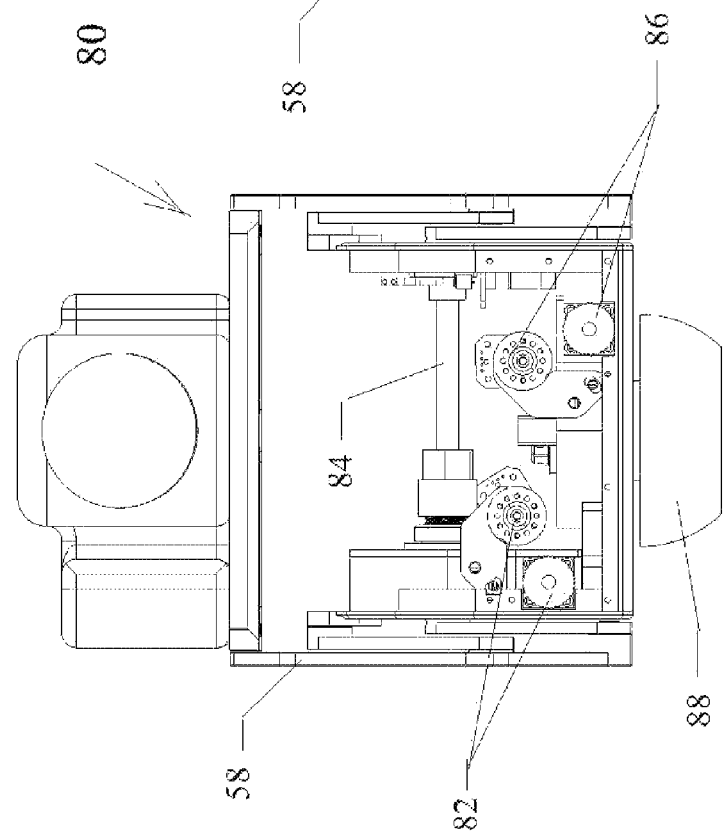

NODAL COMPACT TILT MECHANISM

CROSS-REFERENCE TO RELATED APPLICATIONS

Provisional Application No. 61/816,935, filed Apr. 29, 2013

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tilt mechanisms for cameras, video cameras, other imaging devices, projectile launchers, pointing devices, or any other payload.

2. Description of Related Art

There are three traditional tilt mechanisms for cameras or other payloads. A "gear head" tilts nodally by having a payload move within the arc of a circle or partial circle, but this mechanism has a very limited degree of movement. A cradle style "L" shaped or similar "U" shaped tilt mechanism rotates nodally by holding the payload in a cradle, but the cradle obstructs one or both sides of the payload. A direct side-mount directly mounts the side of a camera or other payload to rotating tilt support blocks that obstruct the supported side of the payload.

A traditional tripod tilt mechanism has a nodal point below the camera attachment plate making nodal movement impossible.

Other devices either can't achieve a camera nodal movement (such as a standard tripod head), or if they can, they obstruct the sides of the camera (such as a "L" or yolk mount), or have a relatively short degree of travel (as in a geared head).

BRIEF SUMMARY OF THE INVENTION

A tilt mechanism according to the present invention provides desirable qualities. 1. It provides camera nodal movement. 2. It does not obstruct the sides of the camera. 3. It provides a high degree of movement. 4. It remains relatively small and compact, thus solving the problems with "gear head," L-shaped, U-shaped and other tilt mechanisms.

The tilt mechanism of the current invention allows for nodal tilt of a camera or other payload to a high degree without obstructing any side of the camera. It uses two rotating plates that are linked together with linkage arms. The linkage arms transfer the rotational movement of the plates above the mechanism to a camera attachment plate. The rotating plate has a nodal point identical to the linkage plates, located above the plate where the camera is positioned. There is no side support above the attachment plate in this design allowing access to the camera on all sides.

The tilt mechanism of the current invention allows for nodal movement without the limitations of a geared head and without the obstructions of "L" or Yolk style tilt mechanisms.

This invention is an improvement because the tilt mechanism of the current invention allows for nodal movement without the limitations of a geared head and without the obstructions of "L" or Yolk style tilt mechanisms.

The embodiments of the current invention shown and described here include:
1. Tilt Base
2. Rotating Linkage Plate
3. Linkage Arm
4. Payload Mounting Plate Two rotating linkage plates pivot around attachment points on the tilt base. Two linkage arms are attached to the rotating linkage plates. Being attached in this way, the linkage arms maintain a vertical and parallel orientation as the linkage plates rotate around their attachment points. The camera mounting plate is attached to the top of the linkage arms. The rotational movement of the rotating linkage plates is then transferred to the camera mounting plate above.

The rotation of the rotating linkage plates is transferred to the camera mounting plate via the linkage arms, creating the same nodal movement from the rotating linkage plates to the camera mounting plate above.

The tilt mechanism could be made from any solid material such as aluminum and plastic. Parts could be machined, cast, molded, or made in a number of ways. All elements listed are necessary, additional hardware such as pins, screws, and bearings are required to hold the rotating parts together. Also, an optional Connection Shaft (5) may be added to link opposing sides together to increase strength and/or add motorization to the mechanism to create a motorized or motion control tilt mechanism.

The linkage arms can be formed to allow further rotational movement by making them not straight. By removing a linkage arm from each side, and linking the pivot of the rotating linkage plates together with a gear or pulley, the tilt mechanism could rotate completely.

The tilt mechanism is applicable for use with camera tripods, tripod heads, camera motion control systems, motorized heads, or any use that requires a camera to be tilted nodally.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 1 is right side elevation view of a tilt mechanism according to the present invention showing use with a camera tilted flat;

FIG. 2 is a rear elevation view of the tilt mechanism of FIG. 1;

FIG. 5 is a left side elevation view of a preferred embodiment of a tilt mechanism according to the present invention;

FIG. 6 is a left side elevation view of the tilt mechanism of FIG. 5 showing the camera tilted up;

FIG. 7 is a front elevation view a fully automated tilt mechanism with the cover plate removed, exposing the automated mechanisms within; and FIG. 8 is a front-top-right side perspective view of the fully automated tilt mechanism of FIG. 7.

DETAILED DESCRIPTION OF THE INVENTION

Figure 3:
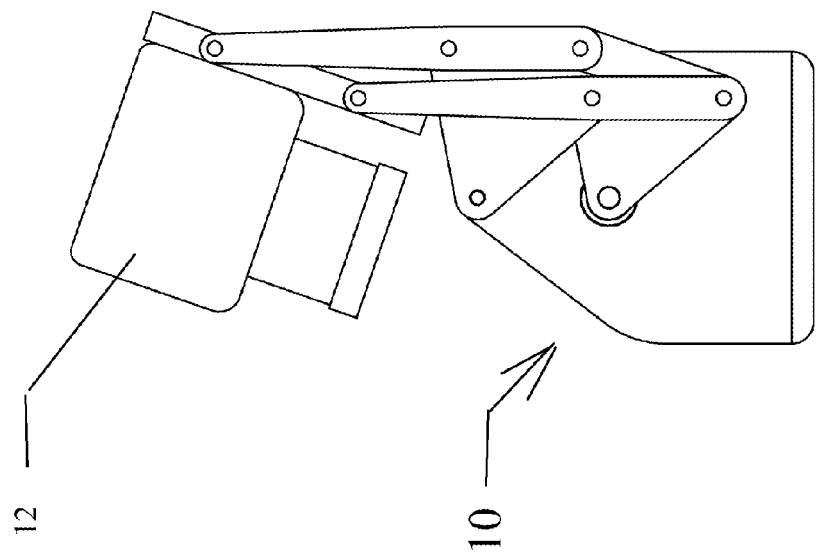
FIG. 3 is a right side elevation view of the tilt mechanism of FIG. 1 showing the camera tilted up.

Referring now to the drawing and in particular to FIG. 1 and FIG. 2, a tilt mechanism of the current invention is referred to generally by reference numeral 10. Tilt mechanism 10 in case illustrated supports a camera 12 and allows for nodal tilt of the camera to a high degree without obstructing any side of the camera. Nodal tilt movement of a payload occurs when the center of the tilt rotation is above the payload's mounting plane, so the payload center of rotation is located within the payload's space. A benefit of nodal movement is that the weight of a payload can be balanced. Another benefit is that that the payload may be positioned so a specific point on the payload aligns with the nodal point. This feature of nodal movement is often utilized with special effects film making, when the nodal point of movement must be aligned with the nodal point of lens.

Tilt mechanism 10 uses two rotating plates. A lower rotating plate 14, which is somewhat triangular in shape, has a rotatable connection 16 to a first linkage arm 18 at one corner of the triangle, a rotatable connection 20 to a second linkage arm 22 at a different corner of the triangle, and a rotatable connection 24 with an upright section 26, which is firmly affixed or integral with support bottom 28. The rotatable connections are near the bottom of each arm. An upper rotating plate 30, which is somewhat triangular in shape, has a rotatable connection 32 to first linkage arm 18 at one corner of the triangle, a rotatable connection 34 to second linkage arm 22 at a different corner of the triangle, and a rotatable connection 36 with upright section 26. The rotatable connections are an equal amount part way up each arm, depending on the desired action. The shape of the plates 14 and 30 are not critical, but the rotational points are in a triangular arrangement.

The linkage arms transfer the rotational movement of the plates above the mechanism to a camera attachment plate 38 which has a rotatable connection to each of the linkage arms on both sides. The rotating plate has a nodal point 40 identical to the linkage plates, above the plate where the camera is positioned. There is no side support above attachment plate 38 in this design to interfere with access to the camera on all sides. The linkage plates, arms and rotatable connections on the opposite form a mirror image of the side illustrated. An optional connection shaft 42 connects the rotatable connections of the lower plates to the upright sections.

Figure 4:
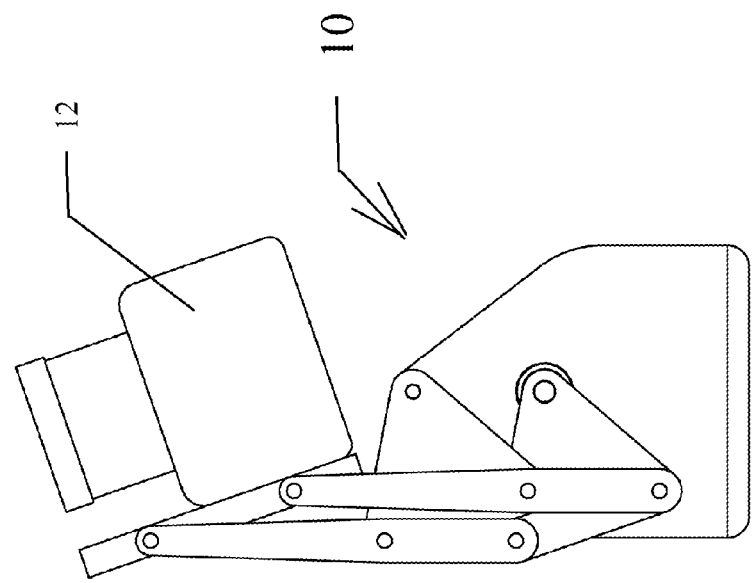
FIG. 4 is a right side elevation view of the tilt mechanism of FIG. 1 showing the camera tilted down.

Referring now to FIG. 3 and FIG. 4, show tilt mechanism 10 tilting camera 12 up and down respectively. This shows one of the advantages of the present invention.

Referring now to FIG. 5 and FIG. 6, a preferred embodiment of a tilt mechanism according to the present invention is referred to generally by reference numeral 50. Tilt mechanism 50 in case illustrated supports a camera 52 and allows for nodal tilt of the camera to a high degree without obstructing any side of the camera. It uses two rotating plates. A lower rotating plate 54, which is somewhat triangular in shape and with a rotatable connection 56 to a first interlocking linkage arm 58 at one corner of the triangle, a rotatable connection 60 to a second interlocking linkage arm 62 at a different corner of the triangle, and a rotatable connection 64 with an upright section 66, which is firmly affixed or integral with support bottom 68. The rotatable connections are near the bottom of each arm. An upper rotating plate 70, which is somewhat triangular in shape and with a rotatable connection 72 to first interlocking linkage arm 58 at one corner of the triangle, a rotatable connection 74 to second interlocking linkage arm 62 at a different corner of the triangle, and a rotatable connection 76 with upright section 66. The rotatable connections are an equal amount part way up each arm, depending on the desired action. The linkage arms transfer the rotational movement of the plates above the mechanism to a camera attachment plate 78 which has a rotatable connection to each of the linkage arms on both sides. The rotating plate has a nodal point similar to that in the prior embodiment, identical to the linkage plates, above the plate where the camera is positioned. There is no side support in this design to interfere with access to the camera on all sides. The linkage plates, arms and rotatable connections on the opposite form a mirror image of the side illustrated. The interlocking linkage plates are substantially straight between the upper and lower rotating plates, but bend outward from each other and then toward each other between the connection for the upper plate and the camera attachment plate, overall forming a shape somewhat similar to facing reverse question marks, but in a way shown clearly with the cameral in the up position shown in FIG. 6. The up position in this embodiment is much more straight-up than in the prior embodiment.

Referring now to FIG. 7 and FIG. 8, a fully automated tilt mechanism is referred to generally by reference numeral 80, wherein similar parts have the same numbers as in FIG. 5 and FIG. 6. A motor and gears assembly 82 rotates connection shaft 84, and therefore also rotates lower rotating plates 54 and 54R, and thus rotates interlocking linkage arms 58, 58R, 62 and 62R. Rotating the linkage arms then also rotates upper rotating plates 70 and 70R. A motor and gears assembly 86 rotates the camera around base 88.

The embodiments of the current invention shown and described here include:

1. Tilt Base
2. Rotating Linkage Plate
3. Linkage Arm
4. Payload Mounting Plate

In summary, two rotating linkage plates pivot around attachment points on the tilt base. Two linkage arms are attached to the rotating linkage plates. Being attached in this way, the linkage arms maintain a vertical and parallel orientation as the linkage plates rotate around their attachment points. The camera mounting plate is attached to the top of the linkage arms. The rotational movement of the rotating linkage plates is then transferred to the camera mounting plate above.

The rotation of the rotating linkage plates is transferred to the camera mounting plate via the Linkage Arms, creating the same nodal movement from the rotating linkage plates to the camera mounting plate above.

The tilt mechanism could be made from any solid material such as aluminum and plastic. Parts could be machined, cast, molded, or made in a number of ways. All elements listed are necessary, additional hardware such as pins, screws, and bearings are required to hold the rotating parts together. Also, an optional Connection Shaft may be added to link opposing sides together to increase strength and/or add motorization to the mechanism to create a motorized or motion control tilt mechanism.

The linkage arms can be formed to allow further rotational movement by making them not straight. By removing a linkage arm from each side, and linking the pivot of the rotating linkage plates together with a gear or pulley, the tilt mechanism could rotate completely.

The tilt mechanism is applicable for use with camera tripods, tripod heads, camera motion control systems, motorized heads, or any use that requires a camera to be tilted nodally.

It can now be seen that a tilt mechanism according to the present invention provides all three desirable qualities. 1. It provides camera nodal movement. 2. It does not obstruct the sides of the camera. 3. It provides a high degree of movement. 4. It remains relatively small and compact, thus solving the problems with prior mechanisms.

Although the tilt mechanism of this invention has been illustrated with a camera as the payload, it can handle many other payloads such as video cameras, other imaging devices, projectile launchers and pointing devices.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A tilt mechanism for a payload comprises the combination of:
   a first linkage arm comprising a first linkage end and a second linkage end;
   a second linkage arm comprising a first linkage end and a second linkage end;
   a lower rotating plate rotatably linked with first end of the first linkage arm and at a different point rotatably linked to the first end of the second linkage arm;
   an upper rotating plate rotatably linked with the first linkage arm and at a different point rotatably linked to the first end of the second linkage arm, wherein the upper rotating plate is closer to the first end than to the second end of each linkage arm;
   a payload attachment plate located above the two rotating plates, wherein the second end of each of the two linkage arms is rotatably linked to different point on the payload attachment plate, thereby transferring the rotational movement of the two rotating plates to the payload attachment plate, and wherein each rotating plate has a nodal point identical to the nodal points of the linkage arms, above the plate where the payload is positioned.

2. A tilt mechanism for a payload according to claim 1, wherein the first linkage arm and the second linkage arm comprise interlocking arms when in a straight-up position.

3. A tilt mechanism for a payload according to claim 2, wherein the payload comprises a camera.

4. A tilt mechanism for a payload according to claim 1, further comprising:
   a base having a first edge and a second edge;
   a first upright section affixed to the first edge of the base; and
   a second upright section affixed to the second edge of the base, wherein:
   the a first linkage arm comprising a first linkage end and a second linkage end, comprises two first linkage arms, one associated with the first upright section and the other associated with the second upright section;
   the second linkage arm comprising a first linkage end and a second linkage end, comprises two second linkage arms, one associated with the first upright section and the other associated with the second upright section;
   the lower rotating plate rotatably linked with first end of the first linkage arm and at a different point rotatably linked to the first end of the second linkage arm, comprises two lower rotating plates, one rotatably connected with the first upright section and the other rotatably connected with the second upright section;
   the upper rotating plate rotatably linked with the first linkage arm and at a different point rotatably linked to the first end of the second linkage arm, comprises two upper rotating plates, one rotatably connected with the first upright section and the other rotatably connected with the second upright section;
   and wherein the payload attachment plate located above the four rotating plates, wherein the second end of each of the four linkage arms is rotatably linked to different point on the payload attachment plate, thereby transferring the rotational movement of the four rotating plates to the payload attachment plate, and wherein each rotating plate has a nodal point identical to the nodal points of the linkage arms, above the plate where the payload is positioned.

5. A tilt mechanism for a payload according to claim 4, wherein the first linkage arms and the second linkage arms comprise interlocking arms when in a straight-up position.

6. A tilt mechanism for a payload according to claim 5, wherein the payload comprises a camera.

7. A tilt mechanism for a payload comprises the combination of:
   a tilt base;
   a rotating linkage plate, which plate is rotatably mounted on the tilt base;
   a payload mounting plate; and
   a linkage arm rotatably connected to the rotating plate at one end and to the payload mounting plate at the other end, wherein:
   the rotating linkage plate comprises two rotating linkage plates, which plates pivot around attachment points on the tilt base;
   the linkage arm comprises two linkage arms, both of which arms are attached to the rotating linkage plates, whereby being attached in this way, the linkage arms maintain a vertical and parallel orientation as the linkage plates rotate around their attachment points; and
   the payload mounting plate is attached to the top of the linkage arms and whereby the rotational movement of the rotating linkage plates is then transferred to the payload mounting plate above.

8. A tilt mechanism for a payload comprises the combination of:
   a tilt base;
   a rotating linkage plate, which plate is rotatably mounted on the tilt base;
   a payload mounting plate; and
   a linkage arm rotatably connected to the rotating plate at one end and to the payload mounting plate at the other end, wherein the rotation of the rotating linkage plates is transferred to the payload mounting plate via the linkage arms, creating the same nodal movement from the rotating linkage plates to the payload mounting plate above.

* * * * *